Feb. 6, 1940.　　　A. G. S. SHERMAN　　　2,189,183
TRAILER DRAFT MECHANISM
Filed Aug. 17, 1936　　　2 Sheets-Sheet 2

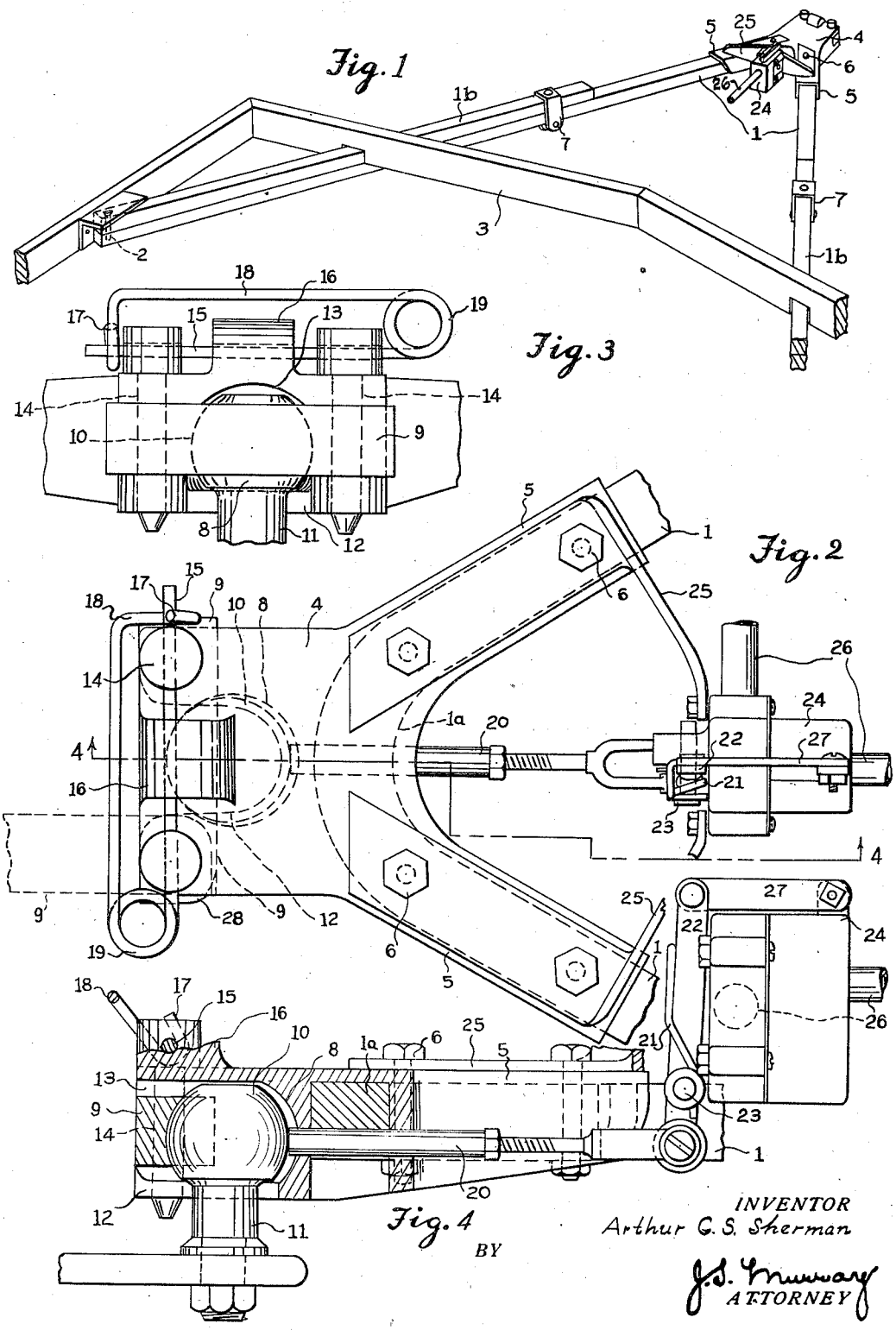

Inventor
Arthur G. S. Sherman

By J. S. Murray
Attorney

Patented Feb. 6, 1940

2,189,183

UNITED STATES PATENT OFFICE 2,189,183

TRAILER DRAFT MECHANISM

Arthur G. S. Sherman, Detroit, Mich.

Application August 17, 1936, Serial No. 96,383

3 Claims. (Cl. 280—33.9)

This invention relates to trailer draft connections, and particularly draft connections exercising control of trailer brakes.

In applying brakes to a trailer, the required braking effort depends largely on several highly variable factors, such as trailer momentum (largely determined by load), road traction conditions, et cetera. If trailer deceleration materially exceeds that of the towing vehicle, undue wear on the trailer tires and undue strain on the draft connection result, while if the towing vehicle decelerates too slowly, it will overrun the towing vehicle and may skid the latter from its course. Such factors entail an automatic control of the trailer brakes, and such control may be advantageously exercised by a device operated in conjunction with the draft connection to the trailer.

An object of the invention is to utilize a limited lost motion travel of a coupling pin connecting a towing vehicle and trailer to actuate a valve or other control device, whereby energization of the trailer brakes will automatically result from deceleration of the towing vehicle, when the brakes of the latter are applied.

Another object is to provide a draw bar having an improved leaf spring formation, particularly adapting it to motor vehicle trailer use.

A further object is to provide a coupling for trailers affording a limited universal play between a towing and trailing vehicle and permitting a quick and easy coupling or uncoupling of such vehicles.

These and various other objects the invention attains by the construction hereinafter described and illustrated in the accompanying drawings, wherein:

Fig. 1 is a fragmentary perspective view of a trailer base frame and of my improved draft connection engaged therewith.

Fig. 2 is a top plan view of the coupling arrangement.

Fig. 3 is a front end view of the same.

Fig. 4 shows the same in longitudinal vertical section, taken on the line 4—4 of Fig. 2.

Figure 5:
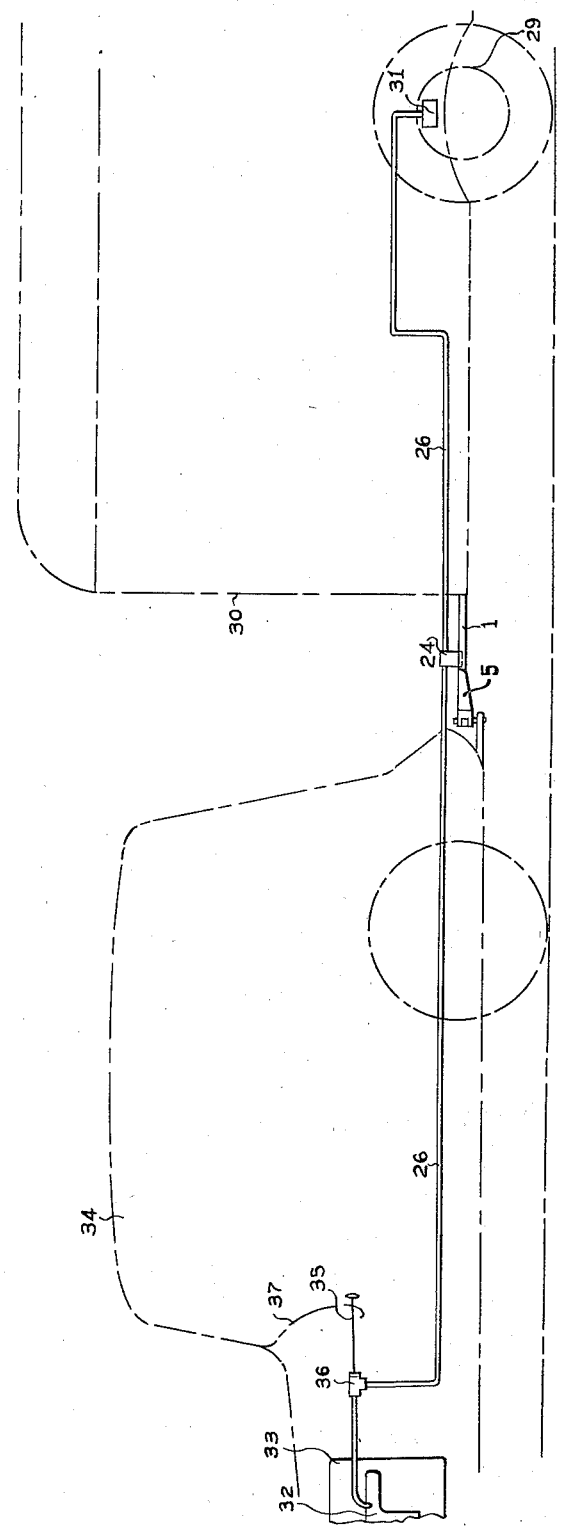
Fig. 5 is a diagrammatic view of a trailer and towing vehicle, shown in elevation, with my improved trailer brake control mechanism installed.

In these views, the reference character 1 designates a pair of forwardly convergent draw bars, secured at their rear ends by bolts 2, or the like, to opposite sides of a trailer base frame 3, and interconnected rigidly and preferably integrally at their front ends. Thus, as best appears in Fig. 2, said bars are formed of a single length of stock formed at the juncture of the bars with an arcuate, short-radius bend 1a. The forward portions of the bars rigidly carry a coupling member 4, comprising a pair of arms 5, rearwardly diverged and downwardly channeled to receive the forward portions of the bars, the channels of said arms communicating to receive the arcuate connection 1a. Bolts 6 or other suitable fastenings rigidly connect the bars to said arms. The bars are preferably of spring steel, permitting a limited, shock-absorbing, up and down movement of their front ends, and as shown, the rear portion of each bar is reinforced by a superposed bar 1b, engaged by the securing means 2 and having its forward portion attached to the underlying bar by clips 7 or the like.

The forward portion of the coupling member 4 forms an approximately spherical socket 8 in conjunction with a latch bolt 9 removably fitted in a groove in the front face of said member, and the ball head 10 of a downwardly projecting coupling pin 11 is engaged in such socket. The opening 12, through which the pin 11 projects is materially smaller than the ball head, prohibiting downward escape of the latter. Upon removal of the latch bolt, the coupling pin is forwardly detachable from the coupling member, said opening 12 being extended for that purpose to the front face of said member, and an opening 13 being formed above the latch bolt for the same purpose.

The latch bolt is normally held in place by a pair of headed pins 14 passed through its end portions and engaging the coupling member above and below said bolt. The heads of such pins seat on the top face of the coupling member and are diametrically bored to receive a retainer 15, engaged between said heads with a lug 16 upstanding from the coupling member. Preferably such retainer is latched in its effective position by engaging one of its ends by a hook 17 terminally formed on an arm 18 spring-connected to its other end. As shown, the retainer, said hooked arm, and a coiled spring connection 19 between the two, are formed of a single length of heavy wire.

An important feature of the invention is a provision for a slight forward and back lost motion of the coupling pin 11 relative to the coupling member 4, and utilization thereof to apply and release the trailer brakes (not shown), when required. Thus, as best appears in Figs. 2 and 4, the socket 8 is elongated in the direction of draft to afford the ball head 10 a predetermined play in that direction. During normal transmission of draft, this play is taken up, as shown, by the thrust of the ball head against the latch bolt 9. Under this condition, a plunger 20, slidable in the coupling member rearwardly and axially of the ball head, projects into the socket 8, responsive to a spring 21 acting on a lever 22 to which the rear end of such plunger is pivoted. The lever is fulcrumed, as indicated at 23, on a valve casing 24 mounted rearwardly of the coupling member 4 by a pair of strap-iron brackets 25 attached to the arms 5. Within said casing, a valve, of any desired construction, controls fluid energy in a duct 26 to exercise control of the trailer brakes (not shown), and is acted on by said lever through a link 27. The spring 21 normally maintains said valve closed, thereby preventing fluid energization of the trailer brakes through the duct 26. Then, however, the brakes of the towing vehicle are applied, the resultant deceleration of such vehicle engages the ball head 10 with the rear face of the socket 8, or, at least, effects a rearward shifting of the ball head, proportionate to deceleration of the towing vehicle. The resultant rearward actuation of the plunger 20 overcomes the spring 21, and acts on the valve, through the lever and link, to open the duct 26 and permit a fluid energization of the brakes. Thus the trailer brakes (Fig. 5) will be applied with a force automatically proportioned to deceleration of the towing vehicle.

The described retainer transmits no draft stresses and is quickly and easily releasable from the pins 14, although its accidental escape is positively prevented by the spring-latch action of the hooked arm 18. Upon removal of the retainer, either or both of the pins 14 may be withdrawn to uncouple two vehicles (Fig. 5). It is, of course, preferable to withdraw only one of said pins, the latch bolt 9 being then free to swing to the dash line position shown in Fig. 2. To permit such swinging, the rear face of said bolt may be rounded as indicated at 28, in intersecting at least one end of the bolt.

The described ball and socket coupling establishes an exceedingly strong and safe connection between a towing vehicle and trailer, while affording separation thereof by a simple manipulation. The universal play secured by the construction avoids frequent, abrupt, and heavy strains on the draft connection during travel along rough roads or trails, and the spring nature of the draw bars absorbs many heavy stresses that would otherwise react on the towing vehicle. The V-form of the draw bars acts to limit their spring action, which might otherwise be excessive.

Referring now particularly to Fig. 5, the reference character 29 designates a brake effective on a trailer 30, the actuator of such brake comprising a cylinder 31, connected by the aforementioned duct 26 to the intake manifold 32 of the motor 33 energizing the towing vehicle 34.

Suitably accessible on the towing vehicle, is an operating handle or the like 35 for a valve 36 interposed in the duct 26 to interrupt, at will, automatic control of the trailer brakes. Such interruption is desirable on various occasions, as in rearwardly actuating the two vehicles, descending a sharp incline, or when no trailer is attached. As illustrated, the handle 35 is associated with the instrument board 37 of the towing vehicle.

The illustrated arrangement renders the trailer brake control mechanism independent of the mechanism (not shown) controlling the towing vehicle brakes, and thus permits conjoint or independent braking of the two vehicles, as occasion warrants.

The invention is presented as including all such modifications and changes as come within the scope of the following claims.

What I claim is:

1. A draft connection comprising a pair of vertically flexible, resilient draw bars attachable at their rear ends to a trailer and forwardly converging, a yoke member having divergent arms channeled to receive the forward end portions of said draw bars, means rigidly securing said arms to said bars, and a coupling pin engaging the yoke member forwardly of the draw bars.

2. A trailer draft connection comprising a pair of resiliently flexible draw bars, convergently extending forwardly from a trailer, means for rigidly attaching said bars to the trailer, and means rigidly interconnecting the forward ends of the bars, whereby any flexure of the bars must occur in unison.

3. A V-shaped draft connection comprising means carried at the apex of such connection for applying draft thereto, and means for securing the corresponding ends of said connection rigidly and in horizontally spaced relation to a member to be drawn, said connection being flexible, up and down, about its rear ends.

ARTHUR G. S. SHERMAN.